(12) United States Patent
Essig et al.

(10) Patent No.: US 8,928,894 B2
(45) Date of Patent: Jan. 6, 2015

(54) OPTICAL SENSOR

(71) Applicant: Leuze Electronic GmbH + Co. KG, Owen/Teck (DE)

(72) Inventors: Horst Essig, Kirchheim/Teck (DE); Fabian Geiger, Leinfelden-Echterdingen (DE); Dieter Klass, Frickenhausen (DE); Juergen-Ralf Weber, Ebersbach (DE)

(73) Assignee: Leuze Electronic GmbH + Co. KG, Owen/Tuck (DE)

( * ) Notice: Subject to any disclaimer, the term of this patent is extended or adjusted under 35 U.S.C. 154(b) by 269 days.

(21) Appl. No.: 13/648,058

(22) Filed: Oct. 9, 2012

(65) Prior Publication Data
US 2013/0135627 A1    May 30, 2013

(30) Foreign Application Priority Data

Oct. 6, 2011 (DE) ...................... 20 2011 051 565 U

(51) Int. Cl.
*G01B 11/14* (2006.01)
*G01B 11/02* (2006.01)
*G01B 11/04* (2006.01)
*G01B 11/25* (2006.01)

(52) U.S. Cl.
CPC .............. *G01B 11/14* (2013.01); *G01B 11/028* (2013.01); *G01B 11/046* (2013.01); *G01B 11/2522* (2013.01)
USPC ....................................................... 356/623

(58) Field of Classification Search
CPC ...... G01B 11/026; G01B 11/14; G01B 11/00; G01B 11/0608; G01S 17/48
USPC ....................................................... 356/623
See application file for complete search history.

(56) References Cited

U.S. PATENT DOCUMENTS 5,920,382 A * 7/1999 Shimizu et al. .............. 356/3.14
6,064,759 A   5/2000 Buckley et al.
(Continued)

FOREIGN PATENT DOCUMENTS

DE    10 2008 005064 B4    6/2010
EP         0 892 280 B1    1/2005
(Continued)

OTHER PUBLICATIONS

International Search Report for PCT/EP2010/005005 Dated Sep. 16, 2010 With English Translation.

(Continued)

*Primary Examiner* — Tarifur Chowdhury
*Assistant Examiner* — Md Rahman
(74) *Attorney, Agent, or Firm* — Venable LLP; Robert Kinberg

(57) ABSTRACT

A method for optically monitoring an object within a monitoring area includes transmitting light rays with a light transmitting unit that form a line of light on the object. The line of light reflected from the object is imaged on an array of receiving elements that detects the reflected line of light and produces receiving element signals that correspond to measuring points on the object. The receiving element signals are evaluated to structure a distance profile of the object using a triangulation principle. The evaluating includes generating at least one evaluation window which covers in a first direction a local region extending along the line of light and in a second direction a distance range, and using the measuring points located farthest outside within the evaluation window for a left limit point and a right limit point for determining object data.

10 Claims, 6 Drawing Sheets

(56) References Cited

U.S. PATENT DOCUMENTS

| | | |
|---|---|---|
| 7,375,826 B1 | 5/2008 | Lavelle et al. |
| 2005/0111009 A1 | 5/2005 | Keightley et al. |
| 2012/0105825 A1* | 5/2012 | Gogolla et al. ................... 356/8 |

FOREIGN PATENT DOCUMENTS

| | | | |
|---|---|---|---|
| EP | 1 612 509 | A1 | 1/2006 |
| EP | 2 306 145 | A1 | 4/2011 |
| WO | WO-2008/107892 | A1 | 9/2008 |

OTHER PUBLICATIONS

Micro-Epsilon: "Mehr Praezision," ScanControl 2700, URL:http://www.micro-epsilon.com (internet).

* cited by examiner

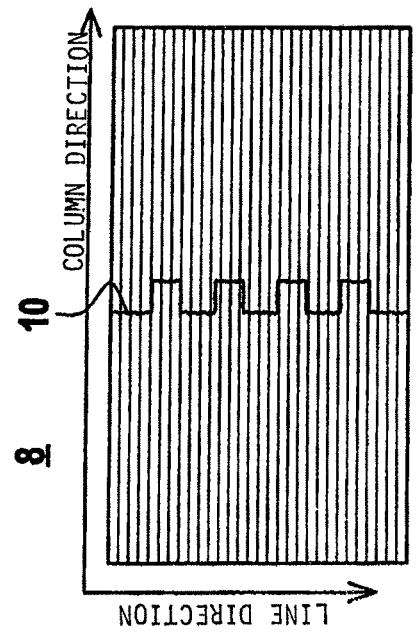
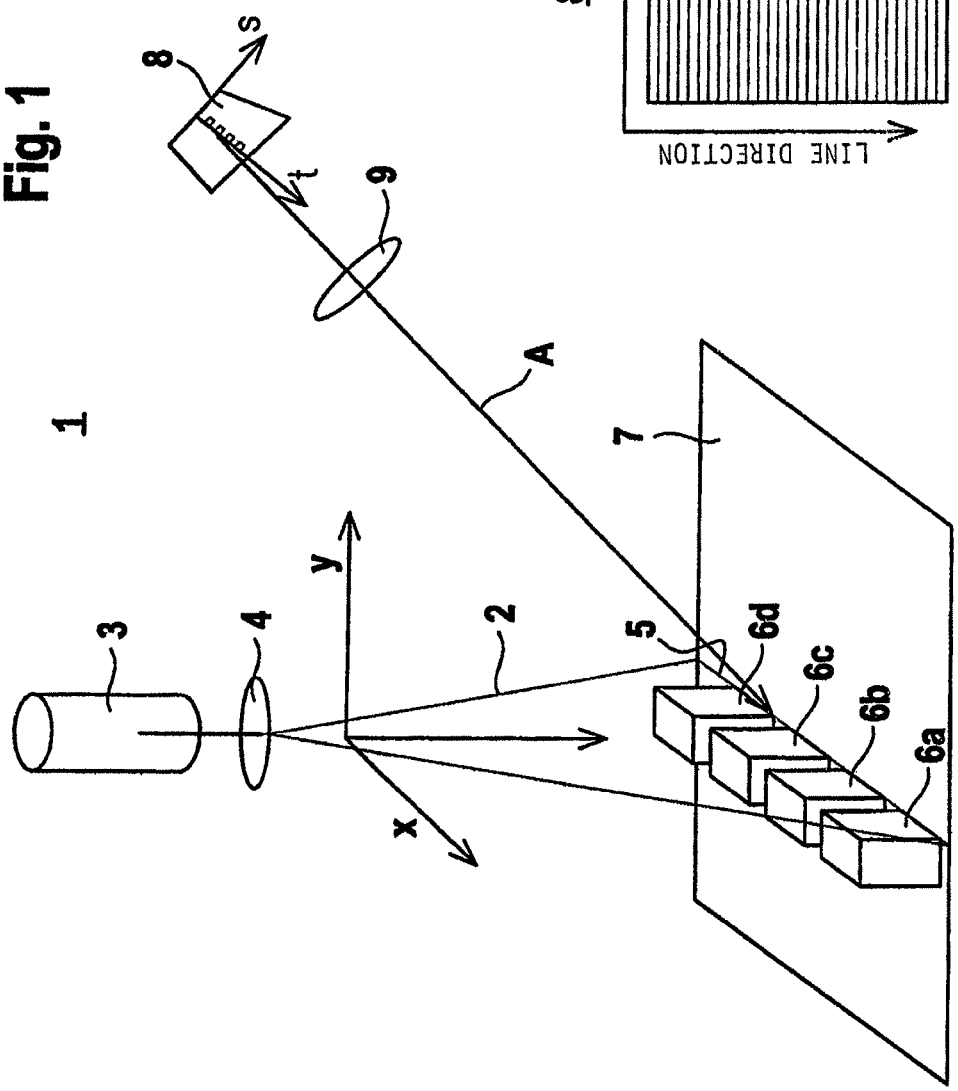

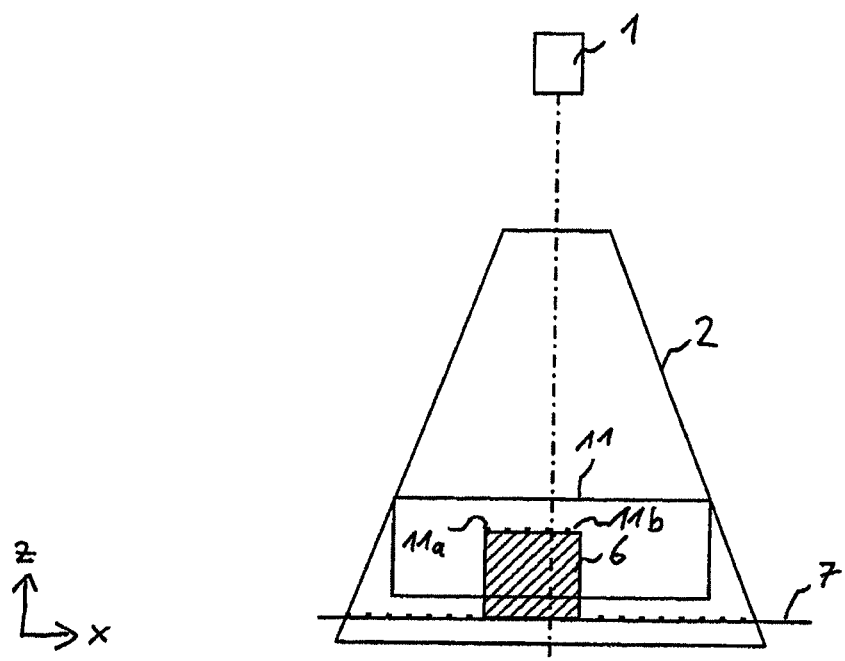

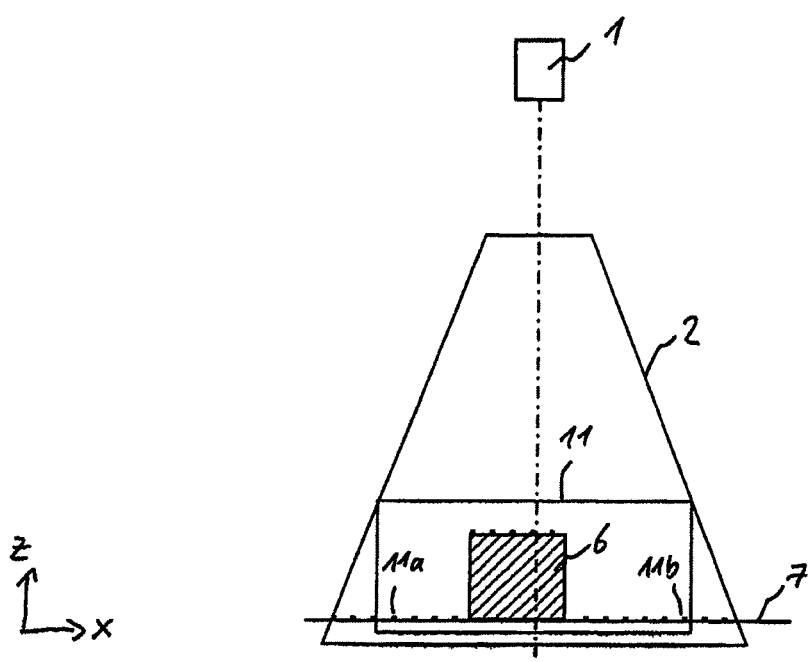

OPTICAL SENSOR

CROSS-REFERENCE TO RELATED APPLICATION

This application claims the priority of German Patent Application DE 20 2011 051 565.6, filed on Oct. 6, 2011, the subject matter of which is incorporated herein by reference.

BACKGROUND OF THE INVENTION

An optical sensor is known, for example, from European patent application EP 2 306 145 A1. This optical sensor comprises a transmitting unit for emitting light rays and a receiving unit comprising a matrix-type array of receiving elements. The light rays are projected in the form a line of light onto an object structure to be detected and are subsequently imaged on the receiving unit. A distance profile for the object structure can be determined in an evaluation unit by evaluating the signals received at the receiving elements and by using the triangulation principle. In the evaluation unit, at least one evaluation window is generated which encompasses in one direction a local region extending along the line of light and in a second direction a distance range. Binary state information is generated by evaluating the number of object points that are located within the evaluation window.

An extensive monitoring area can be scanned with this optical sensor and the line-shaped projection of the light rays emitted by the transmitting unit, wherein it is advantageous that no moving parts are required in this case for deflecting the light rays. Instead, the transmitting unit generates a constant line of light on an object structure to be examined, thus making it possible to detect several objects simultaneously with the optical sensor according to the known system.

Distance information for the objects to be detected is obtained with the aid of the distance measurement that is realized with the triangulation principle. As a result, objects can be detected with local resolution, wherein contour information of objects in particular can be obtained.

By presetting one or several evaluation windows, different objects or object structures can purposely be detected therein. The evaluation windows in this case represent specific segments of the monitoring area, wherein each evaluation window furthermore comprises a defined distance range. The local resolution during the object detection can be predetermined specifically for the respective evaluation windows by presetting this distance range, thus permitting a targeted detection of objects in front of background structures.

Along with the generating of binary state information for each evaluation window, a statement is obtained for each evaluation window on whether or not an expected object structure or an expected object is detected. On the one hand, this evaluation results in the secure and precise detection of an object. On the other hand, it achieves a reduction in data by generating the binary state information from a plurality of object points, so that the evaluation requires only short computing times.

The evaluation of the object points located in an evaluation window is thus generally restricted to counting operations only.

SUMMARY OF THE INVENTION

It is an object of the present invention to expand the functionality of an optical monitoring system of the aforementioned type.

The above and other objects are achieved according to the invention by the provision of a method for optically monitoring an object within a monitoring area, comprising transmitting light rays with a light transmitting unit that form a line of light on the object; imaging the line of light as reflected from the object on an array of receiving elements that detects the reflected line of light and produces receiving element signals that correspond to measuring points on the object; and evaluating the receiving element signals to structure a distance profile of the object using a triangulation principle, the evaluating including generating at least one evaluation window which covers in a first direction a local region extending along the line of light and in a second direction a distance range, and using the measuring points located farthest outside within the evaluation window for a left limit point and a right limit point for determining object data.

The functionality of the optical monitoring method according to the invention is thus expanded such that with the aid of measuring points located in an evaluation window, locally resolved data of an object can be determined, especially the positions of the edges of the object.

For this, the user specifies one or several evaluation windows in a suitable manner, wherein it is advantageous if a value for the difference between the position values of the left limit point and the right limit point in a z (height) direction is only adopted as a valid value for the object height if either the left limit point or the right limit point belongs to the object and the other limit point is located on a substrate on which the object is arranged.

In particular the current measuring points determined with the optical sensor are thus indicated, so that the user can specify the evaluation windows in a suitable manner, in dependence on these measuring points.

Owing to the fact that the evaluation windows can be selected freely by the user and can be adapted easily to the object dimensions and the object geometries to be detected, the edge positions of objects can be determined quickly and with little computing effort. One essential advantage of the invention is the considerable reduction in data as a result of evaluating the measuring points of the optical sensor in the evaluation window, thereby permitting an extremely fast evaluation which nevertheless ensures high detection reliability. The two limit points, meaning the left limit point and the right limit point, are essentially the only ones required for the object detection and, in particular, for detecting the edges within the evaluation window.

The edge positions determined in this way can be output directly at one output for the optical sensor in the form of signals.

In the evaluation unit, the difference between the position value for the left limit point and the right limit point in the x direction is generated additionally or alternatively as a measure for the width of an object and is then output in the form of output signals.

In one embodiment, the value for the difference between the position values for the left limit point and the right limit point in the x direction is adopted in the evaluation unit as a valid value for the width of an object only if the left limit point and the right limit point do not coincide with a boundary for the evaluation window.

Erroneous width determinations are consequently avoided in cases where one object edge is located outside of the evaluation window.

The functionality of the optical monitoring method according to the invention can be expanded further to the effect that the difference in the position values for the left limit point and the right limit point in the z direction is generated in the evaluation window as a measure for the height of an object and is output in the form of a signal.

Additional geometric data of objects can thus be determined along with the height of these objects and the edge positions or widths of the objects.

The height of an object can be determined with the aid of the measuring points located within an evaluation window, but only if one object edge as well as the substrate upon which the object rests are located within the evaluation window.

This requirement may be checked in the optical sensor by making sure that the difference between the position values for the left limit point and the right limit point in the z direction is adopted as a valid value for the object height only if either the left limit point or the right limit point belongs to the object and the value for the other measuring point is derived from a substrate on which the object is arranged.

For the case where the evaluation window is positioned immediately in the above-described manner, the evaluation window suitable for determining the height of the object is determined through an iteration with the aid a multistage process in which a sequence of evaluation windows are specified.

In the process, an earlier evaluation window is defined for an object resting on a substrate, wherein only the object, but not the substrate, is located with at least one edge in this window. By determining the left limit point and the right limit point, the position of the at least one edge is determined for this evaluation window. In dependence on these measuring values, at least one evaluation window is defined so that only one measuring point, meaning the left limit point or the right limit point, belongs to the object while the second limit point belongs to the substrate, wherein the object height is determined by using the left limit point and the right limit point of this evaluation window.

According to another embodiment, the measuring points which are respectively located farthest toward the outside in the evaluation window are adopted as the left limit point and the right limit point and are followed by a minimum number N of successive measuring points within the evaluation window.

The reliability of the object detection is thus increased considerably since incorrect measuring points, caused by interferences in the optical sensor or by faulty locations or by non-homogeneities of objects, can be eliminated.

Alternatively or in addition to determining a left limit point and a right limit point within an evaluation window, the measuring points with the highest and the lowest value in the z direction can also be used in the evaluation unit for the limit points.

This type of embodiment is generally suitable for determining the height profiles of objects.

According to a different embodiment of the invention, logic output variables are determined in the evaluation unit for the evaluation windows, in dependence on the measuring points recorded therein, which are then logically linked in the evaluation unit.

To obtain logically linkable output variables, for example, it is possible to derive criteria for determining whether or not a valid measurement exists by using the measuring points present in the individual evaluation windows.

A validity criterion for determining the edge positions with the aid of the left limit point and the right limit point in an evaluation window can be, for example, whether the respective limit point is followed by the required uninterrupted sequence of a minimum number of measuring points within the evaluation window.

In general, the definition according to the invention of evaluation windows for determining the geometric data of objects can also be combined in the optical sensor with an evaluation in the evaluation window as described in EP 2 306 145 A1. In general, it is thus also possible to logically link output variables of evaluation windows according to the present invention with output variables of evaluation windows as described in the EP 2 306 145 A2.

BRIEF DESCRIPTION OF THE DRAWINGS

These and other features and advantages of the invention will be further understood from the following detailed description of the preferred embodiments with reference to the accompanying drawings, which show in:

FIG. 1 is a schematic representation of an exemplary embodiment of an optical sensor for implementing the method according to the invention.

FIG. 2 is a view from above of the receiving unit for the optical sensor according to FIG. 1.

FIG. 3 is a first variant for defining an evaluation window during the detection of an object using the optical sensor as shown in FIG. 1.

FIGS. 5a and 5b are representations of a sequence of evaluation windows for detecting an object with the optical sensor according to FIG. 1.

DETAILED DESCRIPTION OF THE INVENTION

Figure 4:
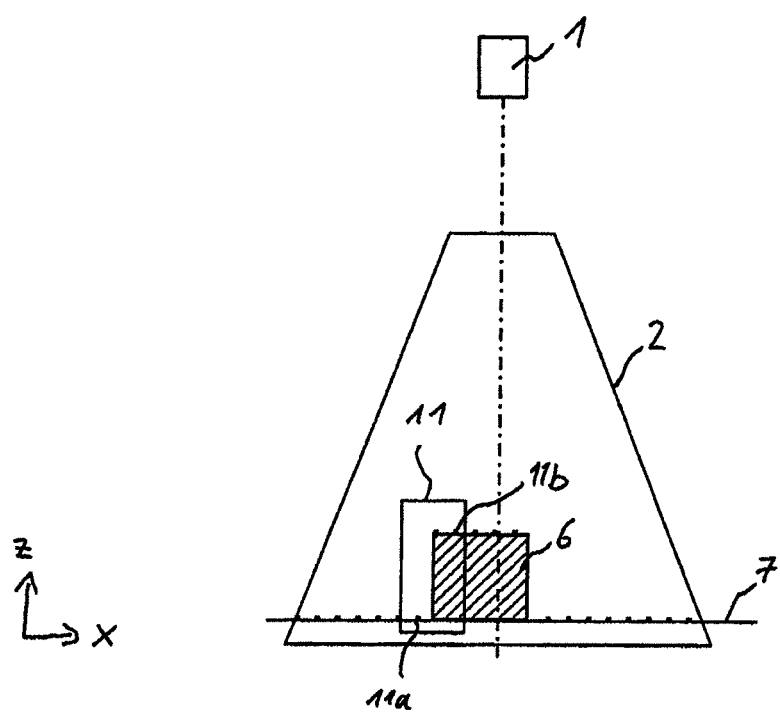
FIG. 4 is a second variant for defining an evaluation window during the detection of an object using the optical sensor according to FIG. 1.

FIG. 1 schematically shows an exemplary embodiment of an optical sensor 1 for implementing the invention. The optical sensor 1 functions as a light section light sensor for realizing distance measurements with the aid of the triangulation principle, thereby permitting a position-sensitive detection of an object within a monitoring range.

The optical sensor 1 comprises a transmitting unit that includes a transmitter 3 for emitting the light rays 2 and a downstream arranged transmitting optics 4. The transmitter 3 for the present case is a laser and in particular a laser diode. The laser emits a bundled laser beam with an approximately circular beam cross section. The transmitting optics 4, which is embodied as expansion optics, is used to spread out the beam into light rays 2 for scanning the monitoring range. The transmitting optics reshapes the laser beam into light rays 2 which have a line-shaped cross section along a straight line, so that a line of light 5 is generated on the surface of an object structure to be detected.

Objects, and in particular also several objects, can be detected at the same time with the line of light 5, formed in this way. For the exemplary embodiment shown in FIG. 1, there are four objects 6a-6d which are arranged on separate tracks and are conveyed on a conveyor belt 7. The conveyor belt 7 moves in the y direction while the objects 6a-6d are arranged side-by-side and spaced apart in the x direction. Accordingly, the line of light 5 of the optical sensor 1 extends in the x direction, so that the objects 6a-6d are detected simultaneously by the light rays 2.

The optical sensor 1 is furthermore provided with a receiving unit 8 for local resolution, comprising a matrix-shaped array of receiving elements, meaning an arrangement of elements divided into lines and columns. The receiving unit 8 in this case is preferably a CMOS (complementary metal oxide semiconductor) or a CCD (charge-coupled device) array. Furthermore assigned to the receiving unit 8 is a receiving optics 9, by which the light rays 2 that are reflected back by the object structures are imaged on the receiving unit 8.

The receiving unit 8 is arranged at a distance to the transmitting unit 3. In addition, the optical axis A of the receiving unit 8 is inclined by an angle relative to the axis of the laser beam which extends in the z direction. In FIG. 1, the line direction for the receiving unit 8 is given the reference t and the column or height direction the reference s. The line direction t extends at least approximately in the x direction.

The optical sensor 1, having components which are integrated into a housing that is not shown herein, furthermore comprises an evaluation unit, also not shown herein, in the form of a microprocessor or the like. The evaluation unit functions on the one hand to activate the transmitting unit 3 and, on the other hand, to evaluate the signals received at the receiving elements of the receiving unit 8.

Distance profiles of object structures can be detected with the optical sensor 1 embodied in this way, wherein this is illustrated in FIG. 2 which shows a view from above of the receiving unit 8 for the optical sensor 1. The line of light 5 which is conducted onto an object structure is imaged with local resolution on the receiving unit 8. In FIG. 2, this is shown with a contour line 10 which corresponds to the object structure according to FIG. 1, consisting of four objects 6a-6d on the conveyor belt 7. Positions in column direction s in this case define the respective height values. If the position of the receiving unit 8 is known, relative to the transmitting unit 3, the contour line 10 is converted to a distance profile, meaning to individual height values z in dependence on the position x in the longitudinal direction of the line of light 5.

FIG. 3 shows a first exemplary embodiment for detecting an object 6 that is arranged on a conveyor belt 7. In FIG. 3, as well as in the subsequent figures, the measuring points determined with the optical sensor 1 are shown schematically as points on the surfaces of the object and the conveyor belt 7. For the sake of a better overview, FIG. 3 only shows a relatively small number of measuring points. In actuality, a considerably higher number of measuring points exist, corresponding to the number of the receiving elements in the receiving unit 8.

The measuring point sequence is displayed for a user on a display unit, not shown herein, which is assigned to the optical sensor 1. The display unit can be a terminal, for example, by which the user can specify a suitably selected evaluation window 11, as shown in FIG. 3. In general, the user can also specify several evaluation windows 11, wherein the user selects the evaluation window 11 in dependence on the measuring task to be realized.

In the present case, the edge positions of the object as well as the width of the object 6 are to be determined. FIG. 3 shows that the evaluation window 11 is selected such that all measuring points on the object 6 are located within the evaluation window 11, whereas all measuring points belonging to the conveyor belt 7 are located outside of the evaluation window 11.

In the evaluation unit, only those measuring points are evaluated which are located within the evaluation window 11, thereby resulting in a considerable reduction in data. From the sequence of measuring points in the evaluation window 11, those measuring points are determined which are positioned locally farthest outside within the evaluation window 11, meaning in the x direction, wherein a first point that faces the left limit of the evaluation window 11 forms the left limit point 11a and a second point which faces the right limit of the evaluation window forms the right limit point 11b.

The x position of the left limit point 11a defines the left edge position of the object 6. The x position of the right limit point 11b defines the right edge position of the object 6. These edge positions can be output via an output on the optical sensor 1 that is not shown herein.

An error check of these measuring values can also be realized prior to the output of the value for the left limit point 11a and the right limit point 11b, wherein this check is designed to determine whether the left limit point 11a as well as the right limit point 11b is respectively followed by a minimum number of N measuring points which form a continuous sequence of measuring points and are all located within the evaluation window 11. The left limit point 11a and/or the right limit point 11b are adopted as the valid edge positions only if this requirement is met. If that is not the case, then starting with a measuring point located outside of the evaluation window 11, the following measuring point inside the evaluation window 11 is adopted as the new left limit point 11a and/or the right limit point 11b. A new check is then realized for this limit point to determine whether it is followed by a minimum number N of successive measuring points within the evaluation window 11.

With the aid of the exemplary embodiment according to FIG. 3, the width of the object 6 can furthermore also be determined and can be output as an additional variable at the output for the optical sensor 1. The width of the object 6 is determined by determining the difference between the x values of the left limit point 11a and the right limit point 11b, preferably as an amount.

A validity check can again be realized, wherein to obtain a valid value for the width of the object 6 it is necessary that neither the left limit point 11a nor the right limit point 11b coincides with a boundary for the evaluation window 11. If that were the case, the object 6 would not be detected completely with the aid of the evaluation window 11, so that the difference between the x position values for the left limit point 11a and the right limit point 11b would not represent a measure for the object width.

As can be seen in FIG. 3, the evaluation window 11 is located completely inside the monitoring range that is scanned by the light rays 2. In principle, the monitoring range could also be enlarged, such that the upper edges are located outside of the evaluation window 11 since no measuring points exist at that location.

FIG. 4 shows a different embodiment for which the height of an object 6 that is arranged on a conveyor belt 7 can be determined with a suitably selected evaluation window 11. As shown in FIG. 4, the evaluation window 11 is positioned so that one edge of the object 6 is located within the evaluation window 11, and measuring points for the object 6 and the conveyor belt 7 are thus located inside the evaluation window 11.

Analogous to the exemplary embodiment shown in FIG. 3, the left limit point 11a and the right limit point 11b in this case are also determined to be the measuring points located farthest outside but within the evaluation window 11. The height of the object 6 is preferably determined by determining the difference for the values in the z position of the left limit point 11a and the right limit point 11b. Since the left limit point 11a is located on the conveyor belt 7 and the right limit point 11b is located on the object 6, forming this difference represents a reliable measure for determining the height of the object 6. The determined height is then output in the form of a signal via the output for the optical sensor 1.

The embodiment according to FIG. 5a shows an evaluation window 11 which is defined such that it does not allow determining the height of the object 6. In this case, all measuring points belonging to the object 6 as well as those adjacent on both sides and belonging to the conveyor belt 7 are located within the evaluation window 11. In this case also, the limit points are determined to be measuring points located farthest toward the outside, as seen from above, within the evaluation window 11. In the process, one measuring point again forms the left limit point 11a and one measuring point forms the right limit point 11b. The left limit point 11a and the right limit point 11b are thus formed by the measuring points belonging to the conveyor belt 7. If the difference between the z position values for the left measuring 11a and the right measuring point 11b is formed for determining the height, a value of nearly zero is obtained or, in general, a value which does not deliver a measure for the object 6 height.

Figure 5B:
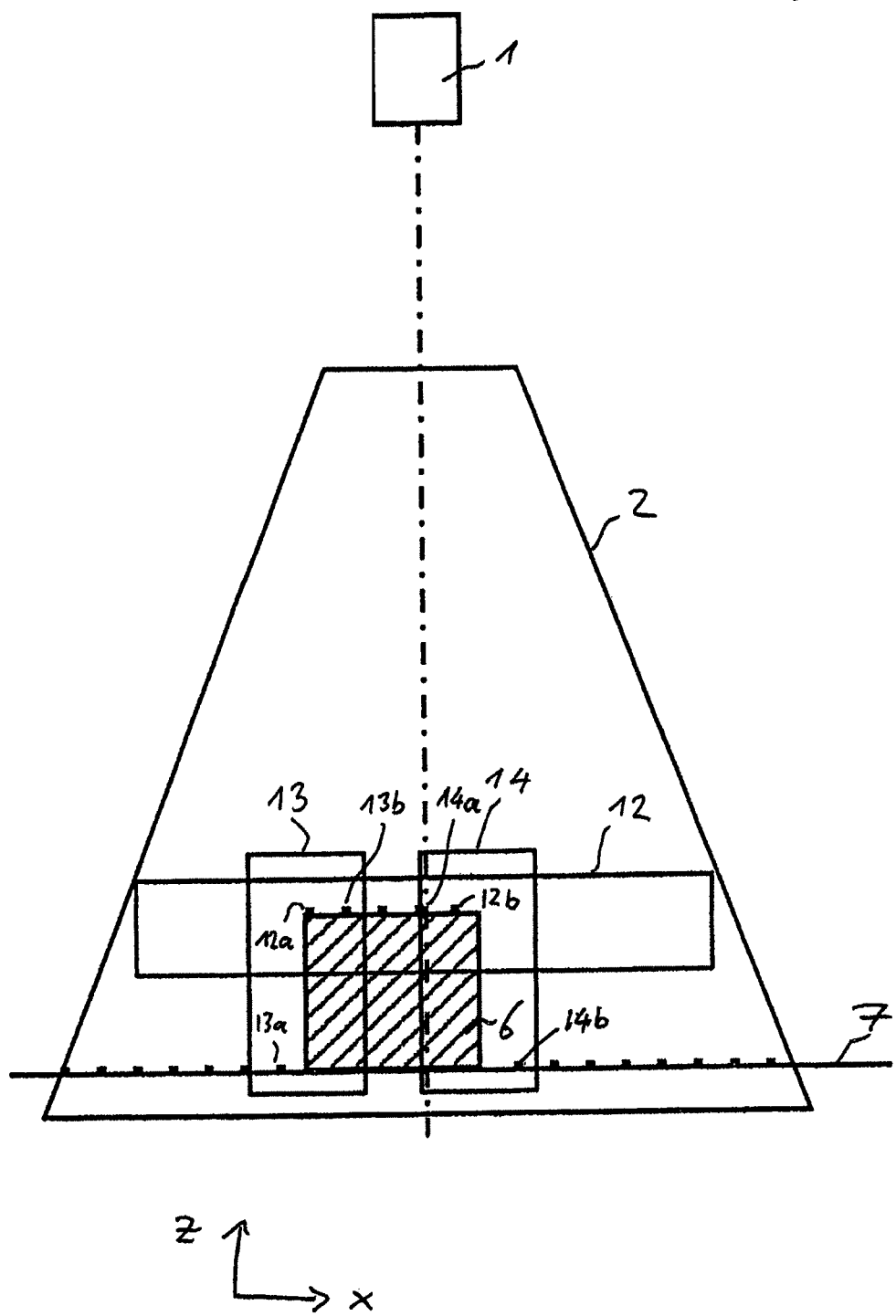

Starting with the situation shown in FIG. 5a, additional evaluation windows 12, 13, 14 are iteratively defined as shown in FIG. 5b, to permit the determination of the object 6 height.

Defined in a first step is the evaluation window 12, shown in FIG. 5b, which differs from the evaluation window 11 shown in FIG. 5a in that the measuring points belonging to the conveyor belt 7 are no longer positioned within the evaluation window 12. The left limit point 12a and the right limit point 12b which are determined for this evaluation window 12 indicate the edge positions of the object 6.

Starting with these edge positions, the evaluation windows 13, 14 are defined, wherein the left edge of the object 6 is located in the evaluation window 13 and the right edge of the object 6 in the evaluation window 14.

In a further step, the left limit point 13a and the right limit point 13b are determined for the evaluation window 13, wherein the left limit point 13a is now a measuring point on the conveyor belt 7 and the right limit point 13b is a measuring point on the object 6. The height of the object 6 is obtained by forming the difference between the z position values for the left limit point 13a and the right limit point 13b.

During a further step, the left limit point 14a and the right limit point 14b are also determined in the same way for the evaluation window 14, wherein the left limit point 14a is a measuring point on the object 6 and the right limit point 14b is a measuring point on the conveyor belt 7. The height of the object 6 is thus obtained by forming the difference between the z position values for the left limit point 14a and the right limit point 14b.

The differential value for the left limit point 13a and the right limit point 13b or the differential value for the left limit point 14a and the right limit point 14b or the mean value of both differential values can subsequently be output as the output variable for the height of the object 6.

Figure 6:
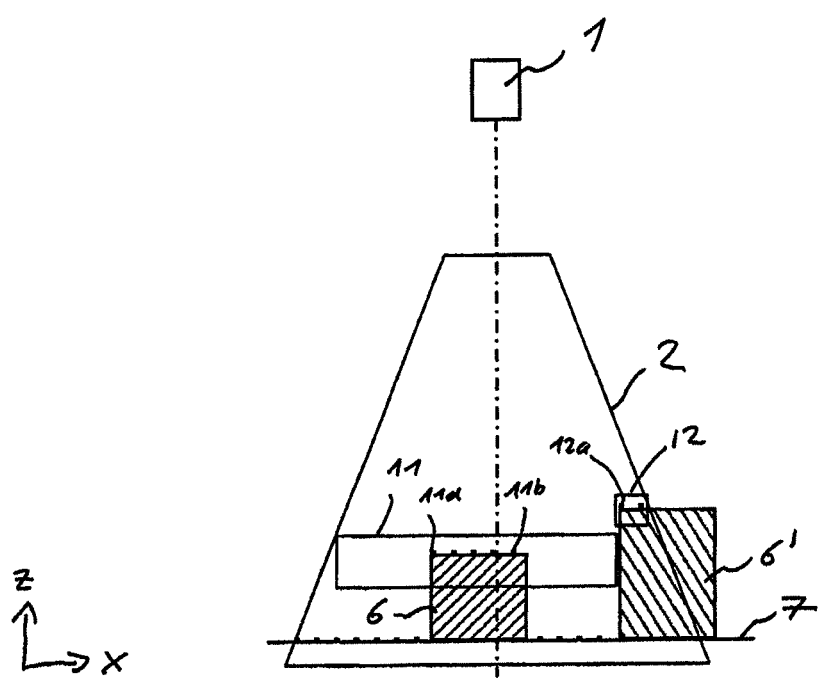
FIG. 6 is a representation of a definition of several evaluation windows for the detection of different objects.

FIG. 6 illustrates an exemplary embodiment for which an object 6 is arranged on a conveyor belt 7, relative to a reference object 6' in the form of an end stop or the like. The evaluation window 11 is used for detecting the object 6. The left limit point 11a and the right limit point 11b within this evaluation window 11 provide the edge positions for the object 6. The evaluation window 12 is used for detecting the reference object 6'. The left limit point 12a in this evaluation window 12 provides the position for the left edge of the reference object 6'. With the aid of this information, the positioning of the object 6, relative to the reference object 6', can be controlled.

It will be understood that the above description of the present invention is susceptible to various modifications, changes and adaptations, and the same are intended to be comprehended within the meaning and range of equivalents of the appended claims.

What is claimed is:

1. A method for optically monitoring an object, arranged on a substrate, within a monitoring area, comprising:
    transmitting light rays with a light transmitting unit that form a line of light on the object;
    imaging the line of light as reflected from the object on an array of receiving elements that detects the reflected line of light and produces receiving element signals that correspond to measuring points on the object; and
    evaluating the receiving element signals to structure a distance profile of the object using a triangulation principle, the evaluating including generating at least one evaluation window which covers in a first direction a local region extending along the line of light and in a second direction a distance range, and using the measuring points located farthest outside within the evaluation window for a left limit point and a right limit point for determining object data, wherein the generating at least one evaluation window includes: defining a preceding evaluation window into which only the object, but not the substrate, extends with at least one edge; determining the left limit point and the right limit point for the preceding evaluation window to determine the position of at least one edge of the object; and defining, in dependence on a measuring value corresponding to one of the determined left or right limit points for the preceding evaluation window, at least one further evaluation window wherein only one measuring point corresponding to either a left limit point or a right limit point of the at least one subsequent window, is located on the object while the other limit point in the at least one further window is located on the substrate, and determining the height of the object from the left limit point and the right limit point of the at least one further evaluation window.

2. The method according to claim 1, wherein the measuring points have respective position values and the evaluating includes forming output signals from the position values for the left limit point and the right limit point which represent edge positions of the object.

3. The method according to claim 1, wherein the evaluating includes forming a difference between the edge position values for the left limit point and the right limit point in the first direction in the evaluation unit as a measure for the width of the object and then outputting the difference as an output signal.

4. The method according to claim 3, wherein the evaluating includes adopting the difference between the position values for the left limit point and the right limit point in the first direction as a valid value for the width of the object only if the left limit point and the right limit point do not coincide with a limit for the evaluation window.

5. The method according to claim 4, wherein the evaluating includes generating a second difference between the position values for the left limit point and the right limit point in the second direction as a measure for a height of the object and then outputting the second difference as a second output signal.

6. The method according to claim 5, wherein the evaluating includes adopting the second difference as a valid value for the height of the object if either the left limit point or the right limit point is located on the object and the other of the left and right limit points is located on the substrate on which the object is arranged.

7. The method according to claim 1, wherein the measuring points respectively positioned farthest to the outside are adopted as the left limit point and the right limit point and that these limit points are followed by a minimum number N of successive measuring points within the evaluation window.

8. The method according to claim 1, wherein the evaluating includes using the measuring points with the highest and the lowest values in the second direction as the limit points in the evaluation unit.

9. The method according to claim 1, wherein the evaluating includes determining output variables that are logically linked in dependence on the measuring points recorded therein.

10. The method according to claim 1, including visually displaying and graphically presetting the evaluation windows.

* * * * *